United States Patent [19]
Vaughan

[11] Patent Number: 5,725,743
[45] Date of Patent: Mar. 10, 1998

[54] ELECTRODE SYSTEM AND USE IN ELECTROLYTIC PROCESSES

[76] Inventor: Daniel J. Vaughan, 36 Paxon Dr., Wilmington, Del. 19803

[21] Appl. No.: 656,755

[22] Filed: Jun. 3, 1996

Related U.S. Application Data

[63] Continuation of Ser. No. 419,237, Apr. 10, 1995, abandoned, which is a continuation-in-part of Ser. No. 142,919, Oct. 29, 1993, Pat. No. 5,423,960.

[51] Int. Cl.$^6$ .................................................. C25B 9/04
[52] U.S. Cl. .................... 204/242; 204/284; 204/292; 204/293; 204/294
[58] Field of Search .................... 204/284, 292, 204/293, 294, 242; 205/334

[56] References Cited

U.S. PATENT DOCUMENTS

| | | | |
|---|---|---|---|
| 3,671,415 | 6/1972 | King et al. | 204/284 |
| 3,821,097 | 6/1974 | Ettel | 204/106 |
| 4,046,663 | 9/1977 | Fleet et al. | 204/280 |
| 4,444,631 | 4/1984 | Bommaraju et al. | 204/284 |
| 4,470,892 | 9/1984 | Das Gupta et al. | 204/105 R |
| 4,680,100 | 7/1987 | Morin | 204/284 |

*Primary Examiner*—Arun S. Phasge

[57] ABSTRACT

An electrode composed of a current element and a fiber element suitable for operation at low voltage and high amperage is disclosed.

6 Claims, 2 Drawing Sheets

ELECTRODE SYSTEM AND USE IN ELECTROLYTIC PROCESSES

CROSS-REFERENCE TO PRIOR APPLICATIONS

This is a continuation of application Ser. No. 08/419,237 filed Apr. 10, 1995, now abandoned. Application Ser. No. 08/419,237 was a continuation-in-part of application Ser. No. 08/142,919, filed Oct. 29, 1993 now U.S. Pat. No. 5,423,960.

THE INVENTION OF THE PRIOR APPLICATION

The invention of the earlier application related to the electrochemical process and the equipment for preparing iodides, e.g. hydriodic acid (HI), iodide salts and other iodide compounds, substantially free of iodine.

Specifically, the invention in the prior application related to an electrochemical process for making iodides in an electrochemical cell having at least an anolyte, a "first electrolyte" and a catholyte separated by cation permeable membranes where: (1) iodine is fed to the catholyte and reduced to iodide; (2) hydrogen ions and other cations are electrotransported from the "first electrolyte" into the catholyte to form iodides; and (3) hydrogen ions are formed in the anolyte and electrotransported to the "first electrolyte".

I had found that separating the oxidizing nature of the anolyte from the reducing nature of the catholyte with an electrolyte facilitated long term electrodialytic production of hydrogen iodide without fouling of the membrane separators and without forming any substantial amount of iodine in the anolyte of the cell. I had also found that the electrolyte separating the anolyte and catholyte could be effectively used for electrotransporting hydrogen ions, metal ions and controlled ratios of hydrogen and metal cations from the electrolyte to the catholyte whereby iodides can be formed simultaneously with the reduction of iodine to iodide at the cell cathode.

FIG. 1 is a schematic representation of the process and the equipment for use in the operation of the invention in the prior application. In operation, a controlled quantity of iodine is added, preferably in aliquotes, to the catholyte feed tank 11 and the electroreduction is carried out to a colorless solution. A part of the catholyte is transferred to product storage tank 12 and the remaining cathlolyte is used for the next batch. The electroreduction process can be operated continuously. However, the efficiency of the electroreduction step decreases with reducing concentration of iodine in the catholyte. Thus, continuous operation to produce essentially iodine-free or low iodine-containing products becomes difficult. In the batch mode, it is necessary to add a hydrogen iodide solution to the catholyte to dissolve the iodine and to provide electrical conductivity.

The electrolytic cell, as shown in FIG. 1, is divided into three compartments by two cation permeable membranes. The anolyte compartment 1 contains an anode and an anolyte. The compartment 2 contains an electrolyte, referred to as the "first electrolyte". The compartment 3 is the catholyte compartment containing a cathode and a catholyte. The catholyte compartment has a means 5 for adding iodine and/or other reactants through 4 directly into the catholyte as solid iodine. However, it is preferable to add the iodine and reactants to tank 11 where the iodine is dissolved in the catholyte and circulated from tank 11 through 5 into the catholyte compartment 3 and back to tank 11. A vent 19 in tank 11 serves to remove any gaseous products formed therein. Other reactants added to the catholyte may be added to tank 11 or directly to the catholyte compartment 3. The catholyte may also be removed from tank 11 or the catholyte compartment 3 through conduit 6A or 6B, respectively, to storage tank 12.

The "first electrolyte" compartment 2 has conduits 7 and 8 for circulating the "first electrolyte" through compartment 2 and, preferably, to tank 13 where reactants are added to maintain the desired composition of the "first electrolyte". When the "first electrolyte" acts as an ion bridge for hydrogen or other cations being electrotransported from the anolyte to the catholyte, the concentration is usually maintained by the addition of water. When the "first electrolyte" is used as feed electrolyte, it is preferable to add materials, especially solids, to tank 13 and circulate the resulting solution through compartment 2.

The anolyte compartment 1 has conduits 9 and 10 for adding anolyte and a vent 18 for removing oxygen and other by-products of the anodic reactions. When the anolyte is a solution of an acid and the anodic by-product is oxygen and the primary product is hydrogen ions, only water addition is required to maintain the composition of the anolyte. When the anodic by-product is chlorine and the basic product is sodium ion or other alkali ion, it is preferable to make additions and removals from an anolyte feed tank 14 having means, not shown, of feeding reactants and removing by-products.

To illustrate the best mode of operating the process, the anolyte is an aqueous solution of phosphoric acid, the "first electrolyte" is an aqueous solution of hypophosphorous acid and the catholyte is a 10 wt. % aqueous solution of hydrogen iodide saturated with iodine. When an electric current is passed through the cell from the anode in compartment 1 to the catholde in compartment 2: (a) water is electrolyzed (oxidized) at the cell anode to form oxygen by-product and hydrogen ions (product); (b) the hydrogen ions are electrotransported through cation permeable membrane 15 into the "first electrolyte" and through the "first electrolyte" (ion bridge) through cation permeable membrane 16 into the catholyte; (c) iodine is reduced at the cathode to iodide ions and the hydrogen ions ionically neutralized the iodide ions to form hydrogen iodide in the catholyte.

When it is desirable to make, for example, sodium iodide, the anolyte could be a solution of a sodium salt and sodium ion; the sodium ion product is electrotransported from the anolyte through the "first electrolyte" into the catholyte where iodide ions react with the sodium ions to form sodium iodide.

The sodium iodide could also be made using an acid anolyte to form hydrogen ions and the "first electrolyte" would contain sodium ions as the feed electrolyte. The hydrogen ions would be electrotransported to the "first electrolyte" and sodium ions transported from the "first electrolyte" to the catholyte. By controlling the concentration of sodium ions and hydrogen ions in the "first electrolyte", it is possible to effect a precise formation of sodium iodide in the catholyte. The sodium iodide is produced free of iodine by controlling the addition of iodine so that the electroreduction of iodine is completed in a batch or semi-batch operation.

Any cation permeable membrane can be used to separate the compartments of the electrochemical cell. However, such membranes should be sufficiently chemically stable to the various electrolytic environments and mechanicall suitable for manufacture and operation. The cation permeable membranes have fixed negative charges and are permeable to positively charged ions. They are preferably membranes of hydrocarbon and halocarbon polymers containing acid and acid derivatives distributed in the polymer matrix. The membranes may be multi-layered structures of different polymers containing reinforcements, fillers and chemical modifiers. The most preferred membranes have high electrical conductivity, are chemically stable to all process conditions and mechanically suitable for design and economical operation of the electrochemical process. These preferred membranes are perfluorosulfonic acid membranes such as Nafion® manufactured by E. I. dupont de Nemours & Company and Flemion® perfluorinated membranes made by Asahi Glass. The most preferred membrane for separation of the catholye from the "first electrolyte" is Nation® 350 membrane having two films of different molecular weights wherein the film of highest molecular weight faces the cathode and Nation® 450 membrane for separating the anolyte from the "first electrolyte".

The preferred cations of the process are cations that are soluble in the anolyte or "first electrolyte" and electrotransportable through cation permeable membranes into the catholyte to react with iodide ions to form salts and other compounds. The most preferred cations are cations of an alkali metal, e.g. sodium, potassium or the like. The materials added to the catholyte can be any cation that forms a salt or any metal complex such as tris (ethylene diamine) cobalt III ion, tetra-amine copper II ion, diamine silver ion, or organic compound such as ethylene diamine that reacts with iodide ions to form addition products and complexes.

The anolyte is an aqueous solution of an acid or salt of an acid that is electrically conductive for economical operation of the process. The preferred anolyte is a solution of an acid or salt of an acid where the by-product is oxygen or halogen and the product is hydrogen ions or metal cations.

The catholyte comprises an aqueous solution of iodide ions. Preferably, the iodide ion concentration is sufficient for dissolution of iodine for economical operation of the process. The iodine concentration in the catholyte can vary over a wide range but preferably it is maintained at the saturation concentration prior to its being reduced to a substantially iodine-free catholyte.

The "first electrolyte" is an aqueous solution of an acid or base or salt or mixtures thereof that is electrically conductive and suitable for electrotransporting the desired ions or ratio of ions into the catholyte. Preferably, the "first electrolyte" is a solution of an acid when only hydrogen ions are electrotransported to the catholyte and, more preferably, a solution of an acid that reduces iodine to iodide and is a solvent for iodine. The "first electrolyte" can be a soluble base, a soluble acid or a soluble salt when electrotransporting cations and mixtures of hydrogen ions and metal cations into the catholyte. The pH of the "first electrolyte" can be varied over a wide range from the pH of the acid solution to the pH of an alkali metal hydroxide. The "first electrolyte" can contain agents to selectively insolubilize cations electrotransported from the anolyte or agents added specifically to the "first electrolyte". The "first electrolyte" can contain agents that reduce metal ions to effect electrotransport of the lower valence ions into the catholyte for forming salts with iodide ions.

The iodide ions can be an I⁻ ion or polyions containing $I_2$. An iodine-free solution is a solution free of iodine but may contain polyiodides.

Cathodes used in the process may be any electrically conductive material resistant to the catholyte. Preferable cathodes are insoluble in the catholyte when polarized or unpolarized and have very large surfaces for efficient cathodic reduction of iodine to iodide. Such materials as reticulated glassy carbon, graphite, Hastelloy C & B, titanium and the like are used in teh preferred cathodes. While solid cathodes may be used, foraminous cathodes are preferred.

FIELD OF THE PRESENT INVENTION

This invention relates to an electrode, particularly a cathode having a very large surface area for electrolysis, suitable for operation at low voltage and high amperage. Specifically, this invention relates to a non-metallic electrode especially suitable for the cathodic reduction of iodine to iodides. This invention also relates to methods for manufacturing and using the electrode.

BACKGROUND OF THE INVENTION

Every electrochemical call is composed of an anode to effect electro-oxidation and a cathode to effect electroreduction. Whereas the anode may require special materials including an electrocatalyst, cathodes can usually be made of most electrically conductive materials. Solid and foraminous electrodes are available and suitable for operation at low voltages, high amperage and high current density, i.e., amperage per unit of electrode surface area. However, these electrodes of small surface area, when operating at a high current density, are not efficient for electrochemical reactions that occur on the surface of the electrode such as the reduction of iodine to an iodide. The reduction is carried out most efficiently at a low current density on electrodes having a very large surface area and suitable for high production rates. Hitherto the prior art has not provided such an electrode.

It is an object of this invention to provide electrodes of very high surface area suitable for carrying out electrochemical reactions on their surface at high amperage and low current density. Another object of the invention is to provide such electrodes of relatively simple shapes and utilizing relatively inexpensive materials, particularly non-metallic materials suitable for use in electrochemical reactions without metal contamination of the products. Still another object is to provide at least one method for making the electrodes and at least one electrochemical process employing the electrode of this invention.

SUMMARY OF THE INVENTION

These and other objects of this invention are achieved by electrodes composed of small diameter electrically conductive fibers. Such electrodes can be used to provide high amperage and low current density while displaying excellent durability and high electrical efficiency.

Specifically, the electrodes are composed of a fiber element having a very large surface area in electrical contact with a current element. Such electrodes are especially suitable for carrying out electrochemical processes on electrode surfaces at high amperage, low voltage and relatively low current density.

BRIEF DESCRIPTION OF THE DRAWINGS

As discussed previously.

DETAILED DESCRIPTION OF THE INVENTION

Figure 1:
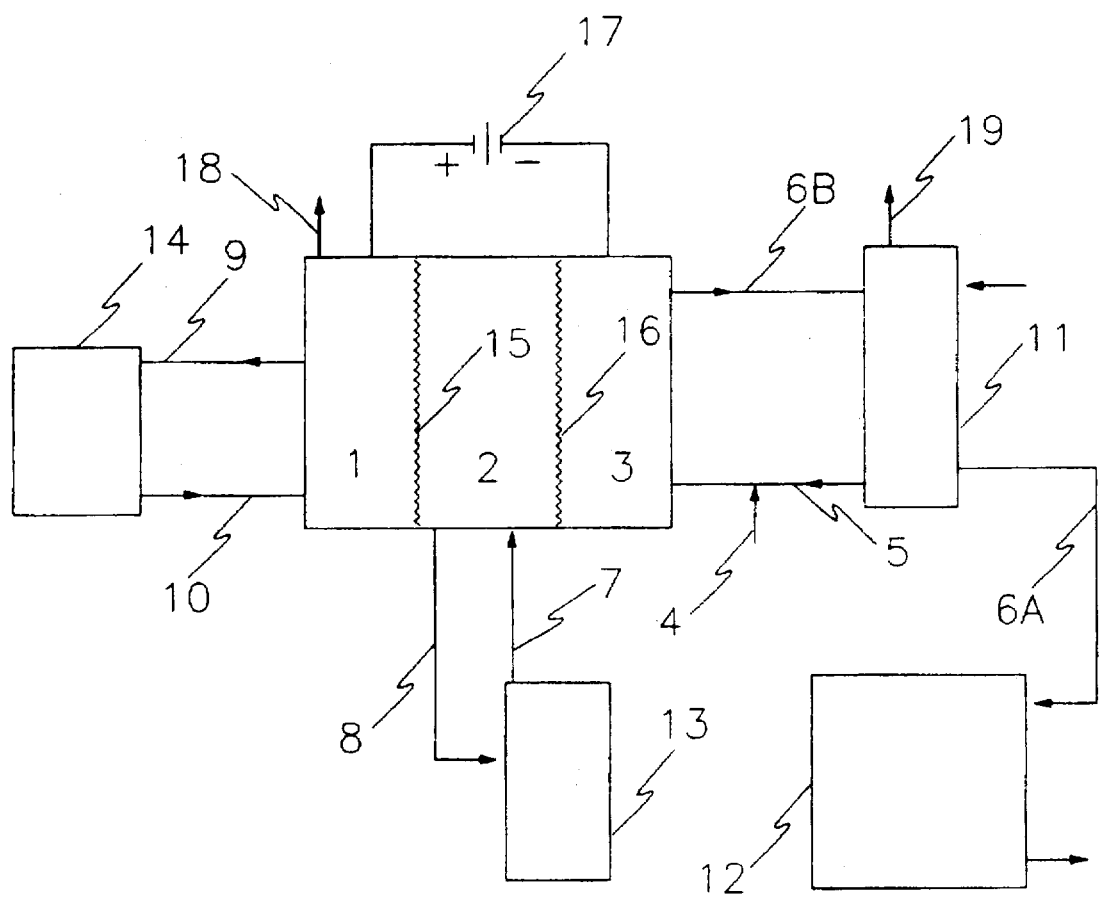
FIG. 1 is a schematic representation of the process and equipment for use in operating the invention in the prior application.

The electrode 20, comprises a current element 21, a fiber element 22, an electrode holder 27, fluid seals 25, conduits 23 and 24 for flow of electrolyte through the electrode 20, and a means 28 to connect current element 21 to an electrical power source 26. It will be noted that the electrode is composed of two electrically conductive elements, a current element 21 and a fiber element 22. The current element 21 may be shaped as bars, rods or any other configuration suitable for the electrolysis apparatus in which the electrode is to be used. The current element 21 may be of graphite, carbon, reduced oxides of titanium or other conductive materials which will not be affected by the electrolyte nor by the products formed during the electrochemical reaction. Metals such as stainless steel, nickel, titanium, etc., with or without an electrocatalyst, such as platinum or iridium oxide, may be used. However, non-metallic conductive materials such as carbon, graphite and reduced oxides of titanium are preferred materials for the current element 21.

The fiber element 22 provides the electrode surface area desirable for low current density electrode reactions. The fiber element, composed of a plurality of fibers, may be in the form of a non-woven felt, a mat, a fabric reinforced non-woven sheet or film, a fabric, or combination thereof. Alternatively, they may be segments of a felt or mat or segments of single fibers in electrical contact with the current element 21. A preferred fiber element is a non-woven felt that is sufficiently porous to permit adequate flow of electrolyte through the fiber element.

The diameter and length of the fibers can vary over a wide range. An essential feature of the electrode is that the fibers must be in electrical contact with the current element 21 so that the fibers do not carry any excess of electrical current sufficient to burn, arc or break electrical contact between the fiber element 22 and the current element 21. It should be understood that the electrical conductivity of the fiber and its diameter and length must be selected to effect a reliable electrical connection between fiber and current elements. Preferably, the fibers are in a mat or non-woven felt form so that current is distributed by many fibers from the current element 21 to the electrolyte.

A preferred method of combining the fiber element 22 with the current element 21 is to fix the current element 21 into a electrode holder 27, using fluid seals 25. The fiber element 22 is then added in an amount sufficient to fill the electrode holder 27. When using relatively loose fibers, it is preferable to use a thread or an open weave fabric to hold the fibers in the holder 27. When using a non-woven felt, it is preferable to weave the felt through the current elements 21 and use strips of the felt to fill the cell holder 27. A thread of an inert material, preferably Teflon® tetrafluoroethylene polymer, may be used to tie and hold the fibers and felt in the electrode holder, thus facilitating assembly of the electrode 20 in an electrochemical cell.

The current density at the surface contact of the fiber element 22 and current element 21 should be adjusted by using a lower voltage of the current element and increased contact area between fibers and current element 21. The fibers are preferably of carbon or reduced oxides of titanium for electrodes having no metal components. However, other fibers that are electrically conductive and not affected by the electrolyte nor by the electrochemical products may also be used. These include metal and other non-metallic fibers. It will be understood that the fibers may contain catalysts and other agents that enhance the performance of the electrode.

The electrode 20 is shown as having a simple rectangular shape with more than one current element 21 and fiber element 22. It should be understood that the electrode is not limited to such a configuration but may have any configuration suitable for the electrolysis apparatus in which the electrode is used. Futhermore, the electrode could have one current element 21 or many current elements.

There is shown a simple electrical connector 26 at the top of a current element 21 for connecting the current element to an electrical supply. The electrical connector 26 is not limited to the connector shown and may be changed as desired. A preferred connector for a non-metallic current element is a press fitted metal connector such as copper coated with nickel.

The means for sealing the current element 21 in the frame or electrode holder 27 from fluid passage, shown as item 25, may be any seal that prevents loss of electrolyte and electrochemical products from the electrode to the environment. Fluid seal 25 could be an O ring fitted over current element 21 and compressed into a cavity in the electrode holder 27 to make a fluid seal. The means of compressing the O ring may be attached to holder 27 or a compression sleeve threaded into the holder 27 may be used. Although it is preferable to fluid seal the current element into an electrode holder, a seal is not essential to the successful use of the electrode.

Conduits 23 and 24 provide a means for flow of electrolytes and electrochemical products through the electrode.

A preferred embodiment of the electrode of this invention is an electrode that has no metal parts in contact with the electrolyte nor with the electrochemical products and is manufactured from relatively inexpensive materials and in relatively simple shapes that are suitable for use as a cathode for the cathodic reduction of iodine to iodides. A preferred electrode for this purpose is disclosed in my earlier application Ser. No. 08/142,919. The electrode 20 comprises an electrode holder 27 made of chlorinated polyvinylchloride or other non-conducctive material, preferably a polymeric material. Current elements 21, preferably graphite rods sealed by an O ring, are inserted through openings 29 in the outer surface of the holder 27 and aligned and held in cavities 30 in the base of holder 27. Fiber element 22, preferably a mat or non-woven felt of carbon fibers, contacts current elements 21 and essentially fills the cavity or volume of the body of the holder 27.

The materials for this non-metallic electrode 20 are relatively inexpensive and provide a very large electrode surface in a relatively small cross-sectional area. The electrode operates at a high amperage, low voltage and low current density; has a long life; does not contaminate the electrolyte with metal; and is stable in operation. It should be understood that other electrically conductive non-metallic materials may be used to make electrodes in accordance with this invention. For example, current element 21 could be rods or other shapes of an electrically conductive reduced oxide of titanium and the fiber element 22 could be carbon fibers or fibers of a reduced oxide of titanium.

The electrode of this invention should contain electrically conductive materials that are sufficiently resistant to the particular electrolyte in which it will operate. The electrode could also be made of a metallic current element and non-metallic fibers; or a non-metallic current element and metal fibers. When the electrode is a cathode, most electrically conductive materials resistant to the electrolyte may be used. Whereas, when the electrode is used as an anode, the materials must be an anodic electrocatalyst or have an anodic catalyst incorporated on the surface of the current element or the fiber element. Alternatively, the anodic catalyst could be incorporated into the elements of the electrode.

The manufacture of the electrode is relatively simple. First, the electrode holder 27 is prepared by shaping a polymeric material or other material that is preferably non-electrically conductive and relatively chemically inert into a rectangular, circular or other geometric form to provide an opening and a cavity for a current element and a fiber element. The walls or sides forming the cavity for the current and fibrous elements may be of any dimensions adapted to retain a volume of a solid current element interconnected electrically with a fibrous element within the cavity. The cavity may measure anywhere from 0.5 to 25 cm. in thickness or depth and anywhere from 2.5 centimeters. to 3 meters in length or width. The opening may measure anywhere from 6.25 square centimeters to 9 square meters, preferably about 1 square meter. Holes are drilled or otherwise cut, usually through the upper portion of the holder adapted to receive the current elements therethrough. Cavities may be provided in the upper surface of the bottom wall or side of the holder to receive and retain the current elements in a stable, usually vertical, position. Seals 25 are provided to surround the current elements, thus further stabilizing them and preventing liquid leaving or entering the holder through these openings 29. Openings are also cut, usually in the vertical sides of the holder, to receive conduits 23 and 24 for entry and exit of the liquid solution being electrolyzed. The insertion of the fiber element into the holder has been described in previous paragraphs.

EXAMPLES

Example 1

Figure 2:
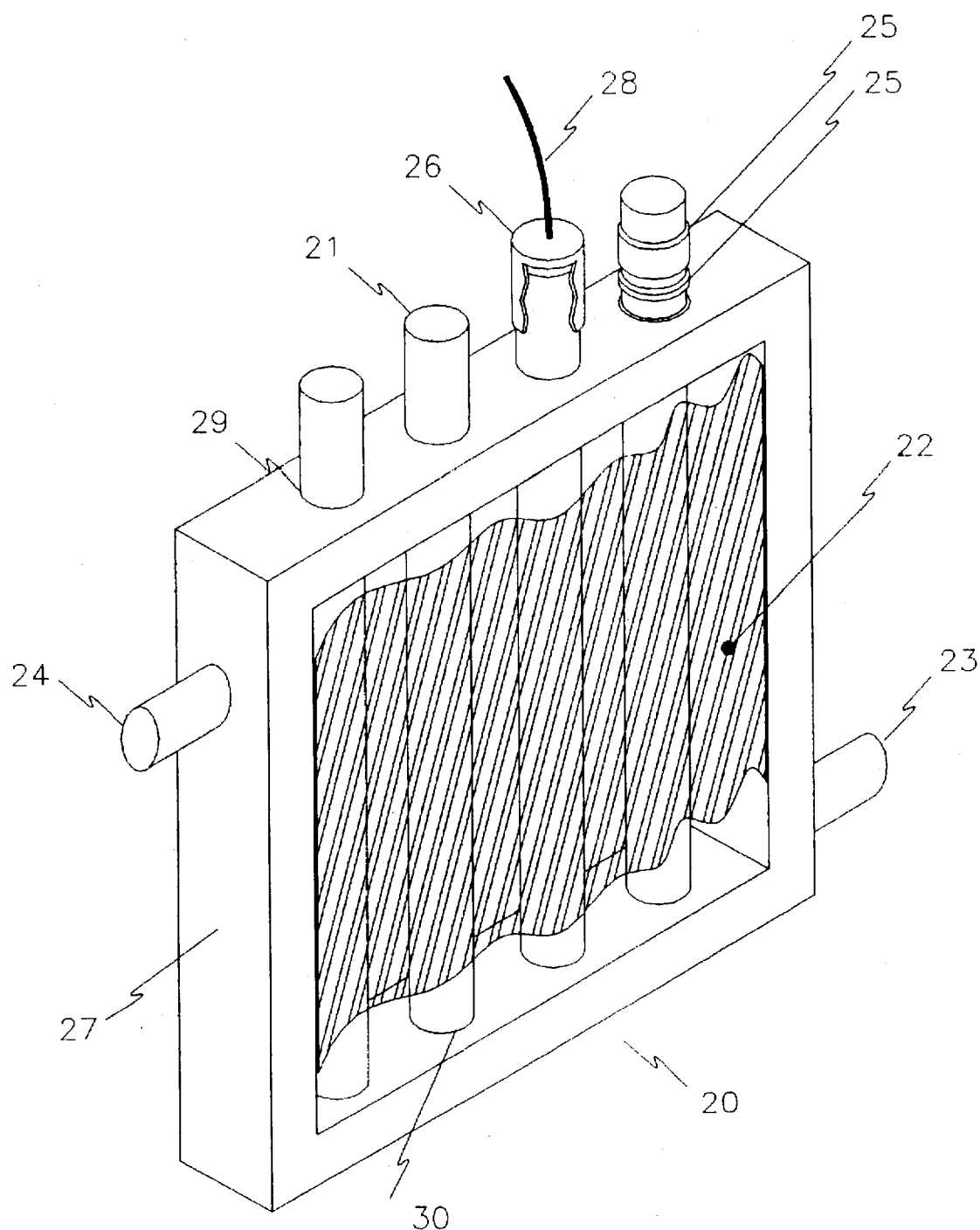
FIG. 2 is a schematic representation of the electrode of the present invention.

An electrode 20 as shown in FIG. 2 was made and consisted of an electrode holder 27 of Teflon® TFE resin having a thickness of 2.54 cm. and an opening of 50.8×50.8 cm., within which 10 graphite rods, 1.27 cm. in diameter, evenly spaced in the frame opening, were sealed into the cell holder by an O ring compression cell. A 0.64 cm. thick mat of carbon fibers was wrapped around each graphite rod to essentially fill the open cavity of the cell holder with fibers. A spring compression copper connector coated with nickel was compressed onto the top of each current element and connected by a copper cable to a copper busbar. Conduits 23 and 24 were inserted in the holder, as shown in FIG. 2, for flow of electrolyte through the electrode.

The electrode was made the cathode of a cell wherein the catholyte was separated by a Nation® 450 cation permeable membrane from an anolyte compartment containing a titanium mesh anode coated with iridium oxide. The anolyte and catholyte compartments were closed by end plates to complete the cell. Current was passed through the cell to form hydrogen ions and oxygen at the anode and to reduce iodine to iodide at the cathode. The catholyte was a solution of hydriodic acid and elemental iodine. The cell was operated for extended periods at 500 amperes at 2.5 volts with excellent production of hydriodic acid essentially free of iodine.

Example 2

The electrode 20, as prepared and used in Example 1, was changed to have current elements 21 of 1.27 cm diameter rods of a reduced oxide of titanium and fiber element 22 fibers of a reduced oxide of titanium. The electrode was used as an anode in combination with the electrode of Example 1 as the cathode to form an electrochemical cell. The anolyte was a 6 wt. % solution of hypophosphorous acid and the catholyte was that of Example 1. The assembled cell was operated for extended periods over several weeks at 500 amperes, 2.8 volts with stable operation and excellent cathodic reduction of iodine to hydriodic acid.

These examples illustrate the use of electrodes of this invention. The electrodes have current elements and high surface fibrous elements in electrical contact therewith that are suitable for operation at high amperage, low voltage and low current density at the electrode surfaces. The examples should not be considered to limit the scope of the invention except to the extent that they are limited by the claims that follow.

What is claimed is:

1. An apparatus for use in an electrolytic process comprising a power source, at least one electrically conductive current element selected from the group consisting of rods, bars and tubes, arranged vertically within a compartment; an electrically conductive fiber element selected from the group consisting of a fibrous mat, non-woven felt, a felt with a fabric reinforcement, a single fiber or mat of fibers or a fabric at least sufficiently surrounding said current element to provide electrical contact with a substantial amount of the surface area of said current element said current element within an electrolyte disposed within said compartment, said current element and said fiber element being of an electrolyte-resistant material suitable for anodic or cathodic electrochemical reactions wherein said power source is in electrical contact with said current element outside of said compartment.

2. The electrode system of claim 1 wherein said current element is a metal.

3. The electrode system of claim 1 wherein said fiber element is a metal fiber.

4. The electrode system of claim 1 wherein said current element is a tube of graphite or of a reduced oxide of titanium.

5. The electrode system of claim 1 wherein said fiber element comprises a fiber of carbon or of a reduced oxide of titanium.

6. The apparatus of claim 1 wherein said at least one current element comprises a plurality of electrically conductive current elements.

* * * * *